United States Patent [19]

Martin et al.

[11] 4,189,704
[45] Feb. 19, 1980

[54] METHOD AND APPARATUS FOR DETERMINATION OF OPTIMUM VELOCITY IN PROCESSING SEISMIC SIGNALS FROM LOW ENERGY SOURCES

[75] Inventors: Lincoln A. Martin, Altadena; William F. Fenley, Jr., Pasadena, both of Calif.

[73] Assignee: Geophysical Systems Corp., Pasadena, Calif.

[21] Appl. No.: 828,778

[22] Filed: Aug. 29, 1977

Related U.S. Application Data

[63] Continuation-in-part of Ser. No. 617,859, Sep. 29, 1975, Pat. No. 4,058,791.

[51] Int. Cl.² .................. G01V 1/24; G01V 01/36
[52] U.S. Cl. ............................................ 367/60; 367/40
[58] Field of Search .............. 340/15.5 MC, 15.5 TA, 340/15.5 DP, 15.5 CC

[56] References Cited

U.S. PATENT DOCUMENTS

| | | | |
|---|---|---|---|
| 3,345,504 | 10/1967 | Doty | 340/15.5 CC |
| 3,496,531 | 2/1970 | Sullivan et al. | 340/15.5 CC |
| 3,638,177 | 1/1972 | Lindblade et al. | 340/15.5 CC |
| 3,651,451 | 3/1972 | Ruehle | 340/15.5 DP |
| 3,696,331 | 10/1972 | Guinzy et al. | 340/15.5 DP |
| 3,714,621 | 1/1973 | Waters | 340/15.5 CC |
| 4,001,768 | 1/1977 | Fort et al. | 340/15.5 DP |
| 4,021,649 | 5/1977 | Fort et al. | 340/15.5 DP |
| 4,037,190 | 7/1977 | Martin | 340/15.5 TA |
| 4,058,791 | 11/1977 | Martin et al. | 340/15.5 CP |

OTHER PUBLICATIONS

"Velocity Spectra-Digital Computer Derivation and Applications of Velocity Functions", Taner et al., Geophysics, vol. 34, No. 6, pp. 859-881, Dec. 1969.

*Primary Examiner*—Howard A. Birmiel
*Attorney, Agent, or Firm*—Daniel Silverman

[57] ABSTRACT

A system and method for carrying out seismic operations with low energy sources, which involves operating the source at spaced points along a seismic spread, the source points are spaced far enough apart so that their seismic waves originate at different points and travel by different paths to the geophones. The geophone outputs cannot be time stacked. The geophone signals are amplified at constant gain and digitized to 1 bit. If the low energy source is a vibratory source, the 1 bit signals are correlated with a 1 bit version of the sweep signal. The resulting correlograms are digitized to 1 bit and C.D.P. stacked and displayed. If the low energy source is impulsive, the 1 bit amplified signals are C.D.P. stacked and displayed. In C.D.P. stacking, the determination of optimum velocity can be carried out by 1 bit processing.

12 Claims, 11 Drawing Figures

METHOD AND APPARATUS FOR DETERMINATION OF OPTIMUM VELOCITY IN PROCESSING SEISMIC SIGNALS FROM LOW ENERGY SOURCES

CROSS REFERENCE TO RELATED APPLICATION

This application is a continuation-in-part of our co-pending application, Ser. No. 617,859, filed Sept. 29, 1975, entitled: Method and Apparatus for Processing Seismic Signals from Low Energy Sources, now U.S. Pat. No. 4,058,791 is entered into this application by reference.

BACKGROUND OF THE INVENTION

The invention lies in the field of seismic geophysical prospecting. More particularly it relates to the processing of seismic signals. Still more particularly it relates to the processing of seismic signals derived from low energy sources, both impulsive sources of relatively short time duration, and low energy oscillatory sources of long time duration. Still more particularly, it relates to the digital processing of seismic signals from low energy sources.

In the early days of seismic exploration, the type of source used for initiation of seismic waves in the earth was an explosive material, such as dynamite. In reflection seismic operations, the dynamite charges were almost exclusively detonated in the bottom of a shallow bore hole, or shot hole, commonly of depth in the range of 50–100 feet, although at times as great as 500 feet or more. The shot hole was generally filled with water to tamp the charge, that is, to couple the explosive more tighlty to the earth.

The geophysicists early discovered that the surface layers of the earth were anomalous, in that they had a very low seismic propagation velocity. This led to errors in determining the travel time of the vertically travelling seismic wave through the surface layers, which was generally called the "weathered layer".

It was found that setting off a dynamite charge at the surface of the earth failed to give as much energy to a deep horizon, than if the same charge was detonated in a borehole at the base of the weathered layer. Therefore, in spite of the extra cost and time of drilling shot holes, and providing the water necessary to drill the holes, and for tamping the charges, this type of operation continued because of the need for information regarding the characteristics of the weathered layer.

This continued for many years until experiments were carried out to develop siesmic sources for use on the surface of the earth. The first of these was called the "weight drop". This involved the use of a large metal block that was lifted to a selected distance above the ground (about 8–12 feet), and suddenly released, permitting it to fall and impact the earth. This impulse on the ground surface did indeed send out a seismic wave which was reflected back from subsurface geological interfaces. However, the geophone signals recorded were extremely noisy, and by the customary process of visually examining seismic records, there was no evidence of the "reflections" that were easily perceived in records recorded from high energy charges in the shot holes.

It quickly becomes clear, that if any use was to be made of such low energy sources as the weight drop, there must be some way to add a large number of such noisy records so as to relatively increase the signal strength and reduce the noise. Saying this in another way, the signal to noise ratio of a single record from a low energy source is very low, too low to be used by conventional visual interpretational methods.

As a result of the need to add repetitive records, a magnetic recording system was devised, which was an analog recording system. Such systems continued in general use in the industry for recording records from low energy sources. To do this, the source and geophone positions were maintained the same and the signals from successive repetitions of the source were added in time synchronism. The successive records were recorded magnetically for the same position of the source and the geophones. The name given to the process was "adding", "stacking", "time stacking", and "compositing", etc. This was used with all types of weak sources, such as the weight drop, the "Vibroseis", and the "Dynoseis", and others, which subsequently came into general use.

The early stacking systems were analog magnetic recording and remained in general use for may years. Then, about 1965, there was a general change to digital magnetic recording of seismic signals. Such digital recording systems involved amplifiers of high gain, and variable gain, until today, the latest systems involve binary-gain-ranging amplifiers that can record digitally the amplitudes of seismic signals to 16 bits, or more.

Although the present low energy systems are applied to the surface of the earth, other means have been devised for overcoming the lack of precise velocity information in the weathered layer.

Also, about 15 years ago, there came into general use a different type of trace stacking or compositing. The stacking system previously described involved adding signals derived from the repetition of a source, where the two signals, or traces were added with their initiation times superimposed. That is, they were added in time alignment.

The new method of stacking was called "Common Depth Point" or "Common Reflection Point" stacking. These are generally referred to as C.D.P. and C.R.P. stacking. In adding traces in C.D.P., the traces must be from different sources and geophones. The important criterion is that all stacked traces must be reflected from the same depth point, or subsurface reflection point. All other portions of the travel paths of the traces are different.

While both time stacking and C.D.P. stacking improved the signal to noise ratio (S/N R) by partially cancelling random noise and adding signal, C.D.P. stacking had many other advantages not possessed by time stacking. Consequently, C.D.P. stacking came into wide use with conventional high energy sources, that is, large explosive charges, where high amplitude traces were recorded. Thus it became general practice to record seismic traces to 16 bits and then to C.D.P. stack.

In C.D.P. stacking, the "fold" of the stack, that is, the number of separate traces stacked to arrive at the final trace (such as two-fold, four-fold, twelve-fold, etc.) is very important. The larger the fold number, the better the S/N R.

C.D.P. stacking is not as simple to perform as is time stacking. In the latter simple synchronous adding of successive repetitions of a trace is sufficient. In C.D.P. stacking a great multiplicity of separate traces, each with different source point and geophone, must be stored digitally in a computer, and recalled in selected order. Considering that each trace is digitized at successive intervals of 0.001, 0.002, or 0.004 seconds, etc., with amplitudes recorded to 16 bits, great volumes of memory are required. For example, in Vibroseis operations, there may be 100-250 traces, or more, for each record, and each record may be recorded for 10-30 seconds, digitized at say 0.004 seconds to 16 bits. This adds up, conservatively to 20 million bits per record trace. So if 20-fold operations are to be carried out, more than 400 million bits must be stored.

Therefore, while high C.D.P. fold is desirable, because of the 16 bit signals and the large storage required, it has become common practice to time stack the traces (say up to 20 times) and then process by C.D.P. stacking, it being felt that the 16 bit digitizing is important, even in view of the poorer stack obtained.

Or, to put it another way, the time stacking of the weak signals was carried over from analog operations to digital processing. The C.D.P. stacking was carried over from high energy source work, where it was standard practice to digitize to 16 bits. So now it is standard paractice, with low energy sources to time stack to bring the signal amplitude up to where 16 bits is meaningful, and then to C.D.P. stack.

In the case of Vibroseis operations it has always been standard practice with digital processing to correlate the trace signals digitized to 16 bits with the sweep signal digitized to 16 bits.

SUMMARY OF THE INVENTION

It is a primary object of this invention in processing seismic records from low energy sources, to overcome the need for very large memory storage in high fold C.D.P. stacking, by digitizing individual traces to 1 bit, thus cutting the memory size to store 1 trace by a factor of about 1/16, thus making it possible to multiply the C.D.P. fold by a factor of about 16 for the same total size of memory required.

It is a further object of this invention to process seismic records from low energy sources such as Vibroseis, by:

(a) initiating each seismic wave at a different spaced source point;
(b) recording received seismic traces and digitizing to 1 bit;
(c) correlating the 1 bit received trace with a 1 bit digitization of the sweep, to obtain a multi-bit correlated trace, then digitizing the correlogram to 1 bit;
(d) C.D.P. stacking the 1 bit digital correlated traces.

It is a still further object of this invention in the process of C.D.P. stacking to determine optimum velocity by means of 1 bit processing.

These and other objects are realized and the limitations of the prior art are overcome in this invention by eliminating the time stacking of the low energy signals, and digitizing the detected signals to 1 bit, to provide multi-bit correlated traces, which are then digitized, stored, processed at 1 bit for determination of optimum velocity, and then as 1 bit signals, C.D.P. stacked.

BRIEF DESCRIPTION OF THE DRAWINGS

These and other objects and advantages of this invention and a better understanding of the principles and details of the invention will be evident from the following description taken in conjunction with the appended drawings, in which.

DESCRIPTION OF THE PREFERRED EMBODIMENT

Figure 1:
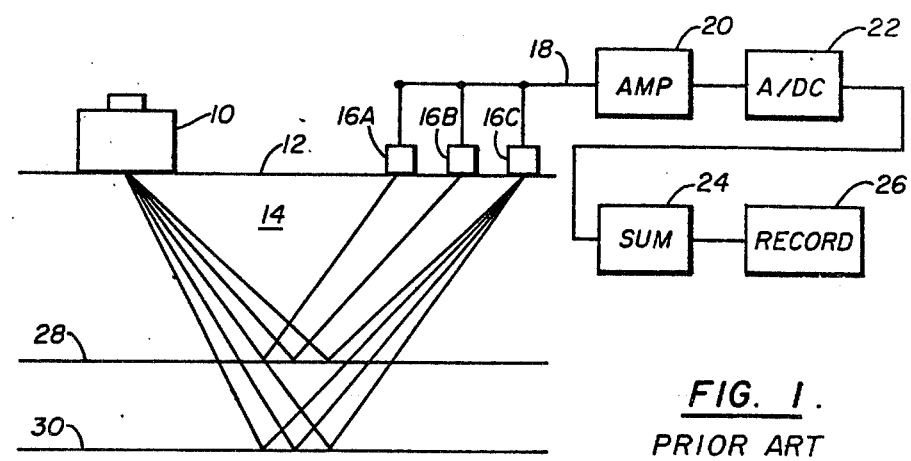
FIG. 1 illustrates the prior art normal seismic field system.

Referring now to the drawings, there is shown in FIG. 1 a conventional prior art seismic system involving a low energy source, such as a weight drop, Dynoseis, Vibroseis, or other suitable low energy source, including a low energy explosive shot on the surface of the earth.

While this invention can be used with both impulsive sources of short time duration and oscillatory sources of relatively long time duration, it is most valuable for the latter systems, such as Vibroseis, particularly because of the large memory storage required in the acquisition of multi-bit composited, uncorrelated data.

There is a seismic source 10, which will, for convenience be considered to be a vibrator source, controlled by an oscillatory sweep signal, of variable frequency, of selected frequency band width, and selected time duration. The vibrator 10 is applied to the surface 12 of the earth 14 in the customary manner. Generally a plurality of vibrators, generally 3 or 4, or more, are used, although only one is shown. All the vibrators are driven in synchronism by the same sweep signal, the purpose being to multiply the seismic energy imparted to the earth, in proportion to the number of vibrators. Since the vibrators are driven as a single source, they are placed in close proximity to each other, and together represent a single source point.

A plurality of spaced geophones, or other vibration detectors, are positioned at or near the surface 12 of the earth. They are connected by cables 18 to a corresponding plurality of variable gain amplifiers 20, as is well known in the art.

The art of seismic amplifiers has developed over the past 40 years or so, in the direction of higher gain and higher fidelity. More recently they have included binary-gain-ranging amplifiers, to provide a high amplitude of signal, or known binary gain at all times. Generally these amplifiers are digitized to 16 or more bits.

The outputs of the amplifiers go to apparatus, indicated for simplicity as analog to digital converter 22, for converting the analog output signal to a digital signal. Generally this apparatus will involve multiplexing and analog to digital conversion as is well known in the art. The signals then go to a summer 24, which is a magnetic recording device, available on the market for adding, or compositing, or stacking seismic traces. Generally 10-20 or more repetitions of the vibrator sweeps are carried out, and the corresponding trace signals are added in the summer. At any one time, the signal stored in the summer is the sum of all repetitions of the sweep for the particular position of the vibrators. While the vibrators do move a short distance (such as 10–20 feet) between repetitions, this is mainly to have a fresh earth surface for each sweep, so that successive seismic waves generated will be the same. Hoewever, the distance travelled between sweeps is small compared to the spacing between geophone groups, or traces on the ground. The summed record is then recorded on magnetic tape for further processing.

To summarize the description of FIG. 1;

(1) the multiple vibrators are driven in synchronism with the same sweep signal, (2) the vibrators are closely spaced and move between successive sweeps only a short distance, so that all sweeps can be considered as originating at a single source point, (3) the geophone signals are amplified with a variable gain amplifier, and the amplitudes are digitized at successive digitizing intervals to 16 bits, (4) the geophone signals from successive sweeps from the same source point are stacked in time synchronization.

Figure 2:
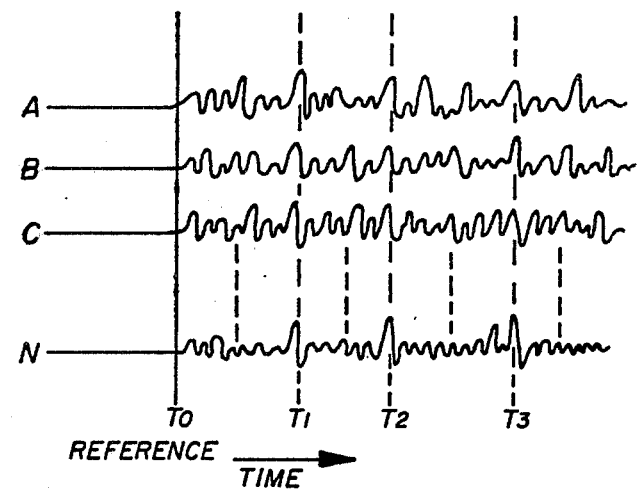
FIG. 2 illustrates the prior art time stacking.

The summing action in the time stacking process is indicated in FIG. 2. There are a plurality of separate traces indicated as A, B, C, .... N. These are shown as analog traces, for convenience. Although time stacking was originally done in analog form, today, the conventional practice is to use the digital summer, after the traces are digitized.

Because of the weak (low energy) source, the detected traces A, B, C, .... N are of poor signal to noise ratio, and the noise masks whatever signal (reflection events) may be present. However, by adding the traces, a sum, or stacked trace S is derived, in which the random noise has been reduced and the signal enhanced. Thus in the sum trace S, the individual reflection events at times T1, T2, and T3 are now obvious over the noise. It will be clear that in time stacking, the traces are added at each value of time after the time reference T0.

Figure 3:
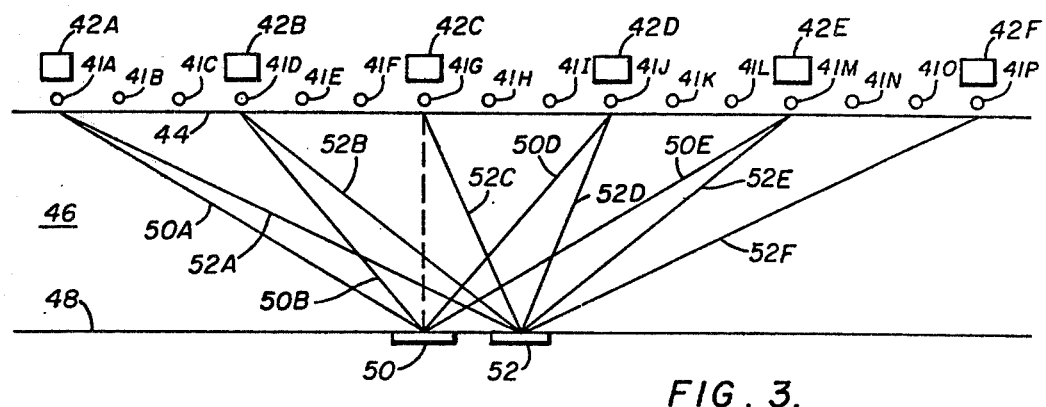
FIG. 3 illustrates the prior art C.D.P. stacking.

Referring to FIG. 3, there is shown another method of stacking traces. It is called common depth point, or common reflection point stacking. Shown are a plurality of geophone groups 41A, 41B, ... 41P arrayed along a survey line on the surface 44 of the earth 46. A reflection horizon 48 is shown. A vibrator (or group of vibrators) operates successively along the survey line at positions every third geophone group, for example. With the vibrator at position 42A, which coincides with geophone position 41A, seismic wave energy may go by path 50A to reflecting area or depth point 50, and then be reflected upward to geophone 41M. Also energy may go by path 52A to depth point 52, and then be reflected upward to geophone position 41P, etc. Similarly, when the vibrator 42B is at geophone position 41D, it will send seismic wave energy to depth point 50 by path 50B, and point 52 by path 52B, etc. and the reflected energy will go by paths 50D to geophones 41J and path 52E to geophone 41M, etc.

It will be seen that the path 42B, 50B, 50, 50D, and 41J, and the path 42A, 50A, 50, 50E and 41M have something in common; they are both reflected at a common depth point 50. By adding the signals or traces travelling by these two paths, they are C.D.P. stacked. This kind of stacking not only cancels out random noise, it cancels out other types of unwanted signals, such as multiple reflections, etc. Therefore, where it can be done, C.D.P. stacking is much preferable to time stacking.

Figure 4:
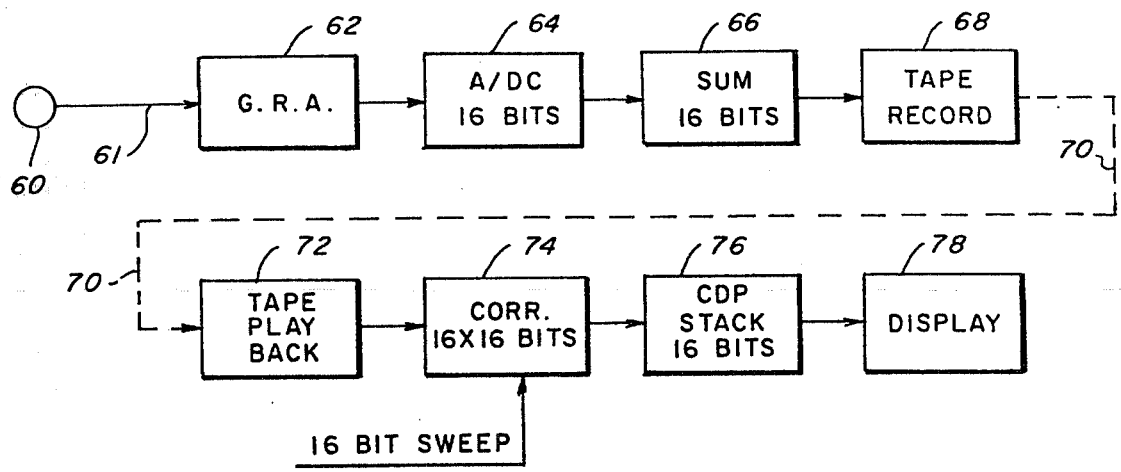
FIG. 4 illustrates the prior art seismic recording and processing systems.

Consider FIG. 4, which is a block diagram of a conventional Vibroseis type of seismic recording and processing system. The geophone group 60 is connected by cable 61 to its gain ranging amplifier 62 and to an analog/digital converter 64, and as a 16 bit word, it goes to a digital summer, or time stacker 66, and to a recorder 68. This is generally a magnetic tape, which then is carried to a processing computer, by dashed path 70 to a tape playback 72. The summed, or added, or stacked, signals are then correlated in a 16 bit × 16 bit correlator 74, against a 16 bit sweep signal from lead 75. The correlated signals of 16 bits are then C.D.P. stacked in stacker 76, and displayed 78.

In reviewing the prior art status of the seismic prospecting industry above, the process can be simply stated as:

(a) gain ranging amplification,
(b) digitization to 16 bits,
(c) time stacking successive repetitions,
(d) correlation to 16×16 bits,
(e) C.D.P. stacking, and
(f) display.

We have found that by detecting the original geophone signals and digitizing them to 1 bit, and correlating the 1 bit signals with a 1 bit version of the sweep signal, and digitizing the resulting correlogram to 1 bit, a 1 bit correlation trace is provided. Now, by C.D.P. stacking the successive correlation traces, a stacked record is provided which can achieve a signal-to-noise ratio higher than that provided by the prior art system due to the potential for higher fold C.D.P. stacking.

Figure 5:
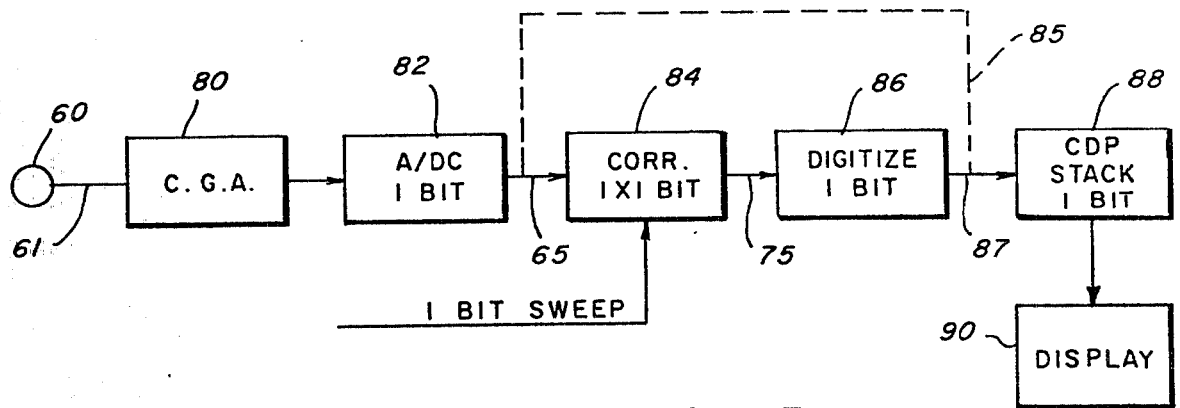
FIG. 5 illustrates the preferred embodiment of the seismic recording and processing system of this invention.

Our improved system is illustrated in FIG. 5. The geophone group 60 signal on lead 61 goes to a constant gain amplifier 80. The output of the amplifier 80 goes to a 1 bit digitizer in the A/D box 82. The 1 bit digitized signal is correlated in 84 against a 1 bit version of the sweep on lead 85, to provide a multi-bit correlated trace on lead 87. This multi-bit trace is then digitized to 1 bit 86. The 1 bit correlated traces are then C.D.P. stacked in 88 and displayed 90. If the source is impulsive, the 1 bit signal then by-passes the correlator 84, and goes by way of 65, 85, and 87 to the C.D.P. stack.

Figure 6:
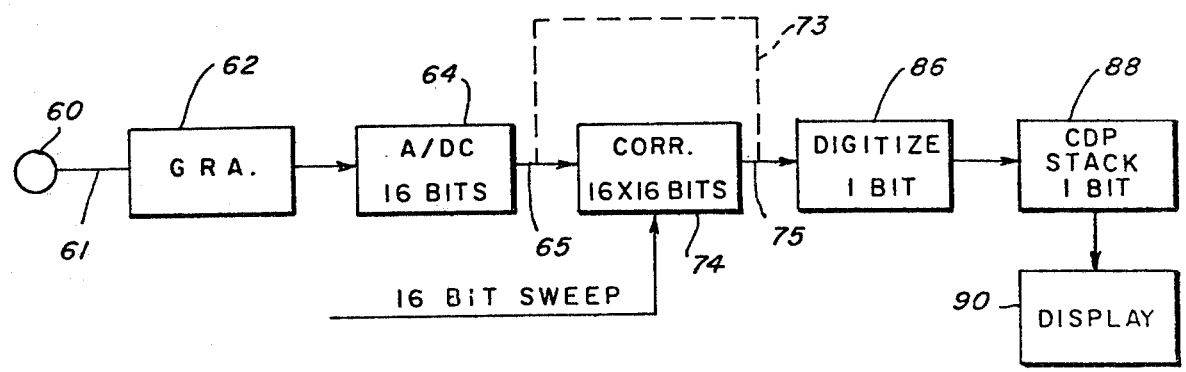
FIG. 6 illustrates a combination of prior art 16 bit recording and correlation with 1 bit C.D.P. stacking.

Shown in FIG. 6 is a combination of FIGS. 4 and 5. This provides for the geophones 60 to transmit their signals 61 to a conventional multi-bit (GRA) amplifier 62. The signals are then digitized to multi-bits (16 bits) in 64.

If the source is impulsive, the signals then pass by way of 65 dashed line 73, and 75 to 86 where they are digitized to 1 bit.

If the source is vibratory, the 16 bit signals from 64 go by way of 65 to a 16×16 bit correlator 74, and by way of 75 to 86 to be digitized to 1 bit. The 1 bit signals are C.D.P. stacked in 88 and then displayed 90, in a conventional manner.

The important part of this invention is the reduction (to zero is possible) of straight stacking, and the increase to very high fold C.D.P. stacking. By very high fold, we mean, in the range of 40 to 50 or more, up to many hundreds. To handle this very high fold C.D.P., it becomes essential to reduce the multi-bit signals to 1 bit for storage and gather.

Since the signals are to be digitized to 1 bit before C.D.P. stack, it seems to be more logical to follow FIG. 5 rather than FIG. 6, for both impulsive and vibratory signals. The digitizer 86 is required, since in the correlation process, even though 1 bit signals are correlated, the summing action provides multi-bit correlograms.

For conventional computers which handle 16 bit words, there is no speed advantage in correlating 1 bit words, since they must be filled out to 16 bits. However, with special equipment, the 1 bit signals could be correlated more rapidly than the 16 bit signals.

Why wasn't this system discovered earlier? The reason, we believe, is that the seismic industry believed too strongly that the best amplifier system, for use in seismic recording was one that had the widest range of recording without distortion, and a true amplitude measurement at all times. This concept was carried over even to the records recorded from low energy sources, even though the records contained very low signal amplitude.

It was not until Fort et al (U.S. Pat. No. 3,883,725) discovered that it was possible to record seismic records to 1 bit and by stacking a selected number of repetitions, that it was possible to provide a final record undistinguishable from the conventional record using 16 bit recording. Also, the seismic industry believed and still believes that the correlation of seismic records must be made between two 16 bit signals.

We have discovered that it is possible to correlate the 1 bit record trace with a 1 bit sweep, to get the same final records, provided that there are the same number of repetitions or stacks.

This 1 bit×1 bit correlation and the storage of all traces as 1 bit signals makes it possible to do all the stacking in the C.D.P. mode, and thereby to obtain a greater benefit in S/N R, reduction, of interference from multiple reflections, and other benefits, without any greater cost in apparatus or time, than in the conventional system.

Of course, our system, as shown in FIG. 5 permits great simplification in the field data gathering system, such as elimination of the gain ranging amplifier and digitizer. However, this forms no part of our invention, and was discovered by Fort et al.

Our system also eliminates the summer as conventionally used. Also, the simplification taught by Fort et al permits inclusion of the field recording instruments of a minicomputer and peripheral equipment, so that the recorder and playback 68, 72 can, in effect, be eliminated. This permits the correlations to be made on line, as the traces are recorded, because the 1 bit×1 bit correlation is so fast.

However, the main improvement is the high fold of C.D.P. stacking permitted with no greater memory required, because of the 1 bit correlated signals handled. This high fold C.D.P. stacking provides great improvement in the record quality.

In review, this invention is based primarily on two facts; on our discovery that correlation of seismic signals can be made with a 1 bit signal and 1 bit sweep and the resulting correlograms can be digitized to 1 bit to provide adequate final records, faster and more ecnomically than with a multibit correlation. This then leads to the second point; namely, that by operating the source in a C.D.P. stacking format, and storing the data in 1 bit form, the high fold of C.D.P. stacking can be provided.

While this method is ideal for Vibroseis type of operation, it is equally useful to impulsive source operations, and even with high energy sources.

In current high energy source operations, it is customary to do C.D.P. stacking on the received signals. However, because of the 16 bit digitization of the signals, the practical limitations of storage, and the expense of computer operations in performing the C.D.P. stacking, the number of fold is usually quite limited, such as, for example, 6-fold, 12-fold, or as much as 24-fold. However, in this invention, with the handling of signals digitized to one bit, it should be possible to handle of the order of 15 or 16 times as many fold. Thus, in this invention, we envision using as many as 50 to 500 fold C.D.P. stacking, without any larger computer storage capacity, and at less cost.

While we have described the operation of the C.D.P. stacking in terms of a linear array of geophones, this was only for the purpose of illustration and convenience. It is well known that C.D.P. stacking can be done with two-dimensional arrays of geophones and/or sources, and the principles of this invention are applicable to C.D.P. stacking in seismic operation for all possible arrays.

Figure 7:
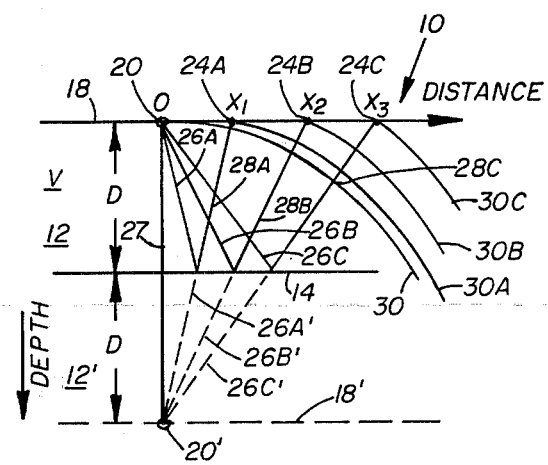
FIGS. 7, 8, 9, and 10 illustrate the prior art determination of optimum velocity in C.D.P. stacking.

Referring now to FIGS. 7-10, all of which are taken from the prior art, indicated by numeral 10 in FIG. 7 is a simplified diagram of the transmission of a seismic impulse, or wave, from a source point 20, at or near the surface 18 of the earth 12, down to a reflecting horizon 14, and back to the surface 18. For convenience, the reflecting surface 14 is assumed to be horizontal, and thus parallel to the earth surface 18, and at a depth D below the surface. The average velocity of the seismic, or elastic, wave in the earth is V.

There are a number of geophones, or other type of vibration sensors, at points 24A, 24B, 24C, etc. spaced at distances X1, X2, X3, etc. away from the source 20. Based on simple theory, it is convenient to consider an image plane 18' which is also parallel to the planes 18, 14, and spaced 2D below the surface 18. In this display, a point 20' on 18' represents the image source of the actual source 20 on the surface 18. The line joining 20, 20' is perpendicular to the plane 14.

Expanding circles 30, 30A, 30B, 30C, etc. are shown centered at 20', which represent successive positions of the seismic wave as it travels outwardly from the source 20' (20).

It is convenient to draw rays 26A', 28A; 26B', 28B; 26C', 28C, etc. or the real, reflected rays 26A, 28A; 26B, 28B; 26C, 38C, etc. representing rays from the source 20 to the reflecting plane 14 and then to geophones 24A, 24B, 24C, etc.

Figure 8:
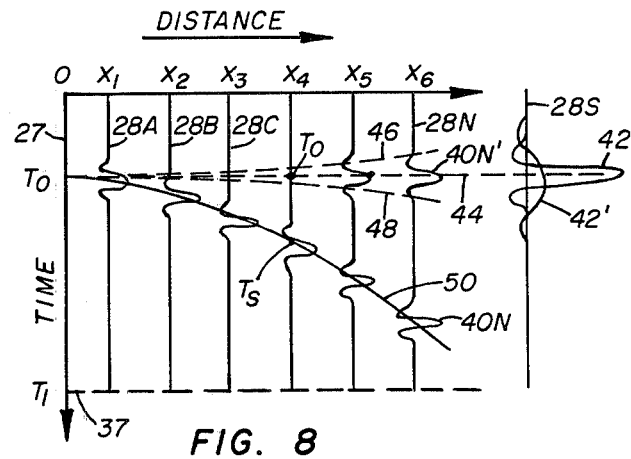

If geophones are present at the points 24, and record the signals generated at the geophones by the arrival of the wave, when plotted vs time, at spaced lines X1, X2, X3, etc. they will look like FIG. 8, where 40 represents the detected wavelet.

The wavelets occur at later times after T0, which is the time of travel back to 0; or to source 20. This is due to the greater distance of travel required on those rays going to the geophones at greater range, or spacing X. This difference in time of travel is called Normal Moveout (NMO).

In normal record processing and display, and also in C.D.P. stacking, it becomes important to correct the time of travel for normal moveout. This is well known, and many technical papers have been written on the subject. One such paper is "Velocity Spectra—Digital Computer Derivation and Application of Velocity Functions" by Taner and Koehler, GEOPHYSICS Vol. XXXIV #6, 12/1969.

There is no need to go through the complete theory at this time, in view of the publications available. It is sufficient to say that the method of correcting for NMO is well known. In simple words, it involves selection of an average velocity V which satisfies the equation A;

$$TS^2 = TO^2 + R^2/V^2 \qquad (A)$$

Where R is the range or distance from the source.

TS is the time of occurence of the wavelet in the original trace, and

T0 is the time of arrival of the pulse at zero range (R=0).

If the correct value of V is chosen, all wavelets 40, on all traces X will provide a T0 value on a horizontal line 44, like 40N', for example. If an incorrect velocity is chosen, then the wavelets (when corrected for NMO) will lie on other lines 46 or 48, for example, above or below 44. When they all lie on 44, then the assumed average velocity corresponds to the true velocity in the earth over the depth of travel D.

The test of whether the wavelets 40 are optimally aligned is to sum the amplitudes of the wavelets at selected values of time. Such a sum wavelet is shown at 42. This has a high peak when the wavelets are well aligned, but has a low amplitude, broad wavelet 42' when they are poorly aligned.

Figure 9:
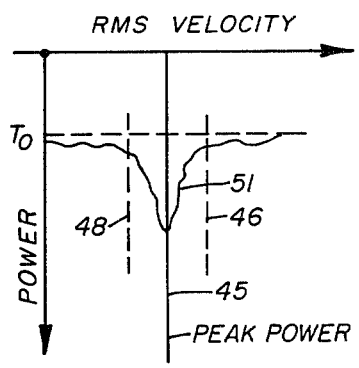

The relationship between peak power, corresponding to the (amplitude)$^2$ of the wavelets, is plotted in FIG. 9, as a function of different selected values of velocity V, below and above the optimum velocity 44 corresponding to the peak power.

Figure 10:
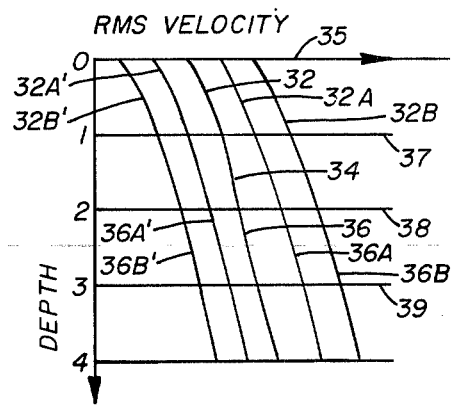

The values of average two-way velocity from the surface to a depth D and return is, of course, a function of depth D. This velocity generally increases with depth. This is shown in FIG. 10, where the curves 32, 34, 36 represent the average velocity vs depth. In view of this curve, it is convenient to make NMO corrections separately for different time windows, represented by the zones, or spaces, between 35, 37, 38, 39, etc.

In other words, in a time window between lines 35, 37, a wavelet 40 is selected having a movement along curve 50. Values of time TO are chosen, and corresponding values of TS calculated and the values of wavelet 40 are then plotted at time TO, like wavelet 40N', and so on. Then another velocity is selected, like curves 32A, 32B, etc. of greater velocity, and 32A', 32B', etc. of lesser velocity, and the wavelets and NMO corrected and replotted. Then a curve like 51 of FIG. 9 is plotted. The value of velocity 45 to give peak power VO is then read off. This value of VO is then used to correct the moveout.

Another way to determine the optimum value of velocity is by a calculation terms "semblance":

$$\text{Semblance} = \frac{\Sigma(\text{absolute amplitude of values of } T_{SUM})}{\Sigma(\Sigma(\text{absolute amplitudes of values of } T_G))}$$

where $T_{SUM}$ represents the sum trace such as 42, and $T_G$ represents the wavelets on each of the traces, like 40N'.

In a qualitative way, this method says that the sum of the amplitudes of $T_G$ is a fixed number, representing the sum of all digitized values, without considering sign. When the wavelets are not well aligned, part of the wavelets will cancel other parts, and the amplitude of $T_{SUM}$ will be less. When they are well aligned, the absolute amplitudes $T_{SUM}$ will be maximum.

In C.D.P. stacking the individual traces are displayed in a C.D.P. gather. Each trace represents a ray from a source at a range R on one side of the C. D. P. point, to a geophone at an equal range R on the other side of the C.D.P. point. Thus the ranges would be twice those shown in FIG. 7.

The C.D.P. gather includes all traces having the same C.D.P. point. This will look something like FIG. 8. Then be equation A, NMO corrections are made using the best available value of V. Then the individual traces 28 are stacked, and a sum trace like 28S is obtained. This is the stacked trace corresponding to the selected C.D.P. point.

An adjacent C.D.P. point is selected and the process is repeated until a full cross-section is obtained, in which each trace represents the stack of all traces reflecting at that C.D.P. point.

The velocity function 32 of FIG. 10 not only changes with depth, but it also changes with distance along a line of survey. This is because of the subsurface "structure" of the earth, which changes as a function of horizontal distance, due to dip of beds, faults, and similar anomalies.

Whenever a well is drilled, a velocity survey can be made in the well, and the average velocity V can be determined precisely as a function of depth. However, where there are no wells, there is no way to determine optimum velocity except by the calculations outlined above, such as peak power, semblance, etc. However, these are complicated calculations and when data are handled in 16 or more bits, they become very time consuming and expensive. Thus it is economically possible to make these calculations only at isolated points, spaced a mile or more apart along the line. This leaves large areas in between these positions where V was determined, where it could be in error, and therefore less than perfect C.D.P. stacking results.

In the parent application Ser. No. 617,859, of of this application, it was pointed out how the overall S/N ratio of seismic data could be improved by a chosen field procedure and a processing program, in which all source operations would be in C.D.P. format, and all data processing from the original data recording to and through the C.D.P. stacking are done in 1 bit digitization, and sufficient channels are recorded to provide C.D.P. fold of at least 40. This improvement in S/N R is obtained at no increase in processing or field cost, due to the economies achieved by 1bit data processing.

In the same way, the processing inherent in determining the optimum velocity and NMO correction can be reduced to the condition where the spacing between depth points at which the optimum velocity is determined, can be reduced, and preferably reduced to adjacent C.D.P. points, or adjacent traces.

This invention is an extension and improvement on our invention in Ser. No. 617,859, and utilizes the same method of recording and processing as claimed in Ser. No. 617,859, plus improvements in the method of carrying out NMO correction in C.D.P. stacking.

There are two parts to this invention;
A. a first part involves doing all the C.D.P. processing by single bit, so that many more selected velocity values can be used at much more closely spaced test points; and
B. A much simplified method of testing for the optimum velocity value has been provided.

As regards to the first part, it will be clear that using 1 bit digital values for the traces, it requires much less memory to store and retrieve data values for various values of TO and $R^2/V^2$. With this lesser requirement for storage, a corresponding greater number of channels or traces can be handled, with the same apparatus.

With 1 bit signals, in searching values of $T_G$, there will be no need for interpolation in case $T_G$ corresponds to a value of time between two digitizing intervals. The value of the function or signal is either a "1" or a "0". However, some convention will be needed, such as, for example, to always select the signal value at the preceding, or following, digitizing interval, and so on.

As to the second improvement, it is related to improved methods of evaluating the coherence of the stacked traces as the result of using one velocity value or another.

There are four embodiments, or methods, for doing this, The first embodiment is a process similar to the conventional "semblance" procedure, but is much simpler, since the trace data (in the C.D.P. gather) are in 1 bit digitization.

Referring back to FIGS. 8 and 10, the procedure for applying NMO is to select a velocity function vs depth. Next, for each trace 28 a value of TO is selected, the value of TS is calculated, the sign (1 or 0) of the trace for that value of time (or for the next digitizing interval) is read, and inserted as the value of the trace at TO, and so on, until all values of TO in the window have been investigated. The new NMO corrected trace is also a 1 bit trace.

Next, this is repeated for all other traces 28. All of the 1 bit NMO corrected traces are then stacked (added) to provide a sum trace. The sum trace is not a 1 bit trace, but could have as many bits at an individual digitization time as there are traces added.

The sum trace is the sum of individual values of amplitude irrespective of sign. Therefore each corrected trace has a sum value which is simply the number of digitized values. Thus, if the traces are 16 seconds long, digitized to 0.004 sec. intervals, there will be 4000 digital values, for each of the traces 28, for the sum trace.

While the intervals are being summed, or stacked, at each digitizing interval, if a record is kept of the absolute amplitudes of the sum trace, then the stacking will automatically provide a "quality" value for the C.D.P. trace, or stacked trace, which, based on semblance, is:

$$\text{Quality} = \frac{\Sigma \text{Absolute Amplitude } T_{SUM}}{N \times K} \quad B$$

Where N is the number of traces 28 stacked, or is the fold number of the C.D.P. trace, and K is the number of digitized values in each trace. Thus very little processing is required and the Quality values fall out as a by-product of the stacking process.

A second embodiment of this invention involves the process of NMO correction of the traces of the C.D.P. gather for a plurality of selected values of velocity, and then stacking the corrected traces to provide one stacked trace for each chosen value of velocity, say traces A1, A2, A3. This procedure is then repeated for a C.D.P. point B which is adjacent to A, and for the same values of velocity, to provide three traces B1, B2, and B3.

Then, in order to determine which velocity value gives the best coherence, traces A1 and B1 are correlated to provide correlogram C1. The same is done for A2 and B2, and A3 and B3, to provide correlograms C2 and C3. Whichever correlogram C1, C2, and C3 has the highest peak value will indicate the best velocity value. Of course, the traces A and B are not 1 bit traces. However, for purposes of correlation and testing, the sign values of the traces, or 1 bit values, can be used as 1 bit traces for rapid correlation.

Figure 11:
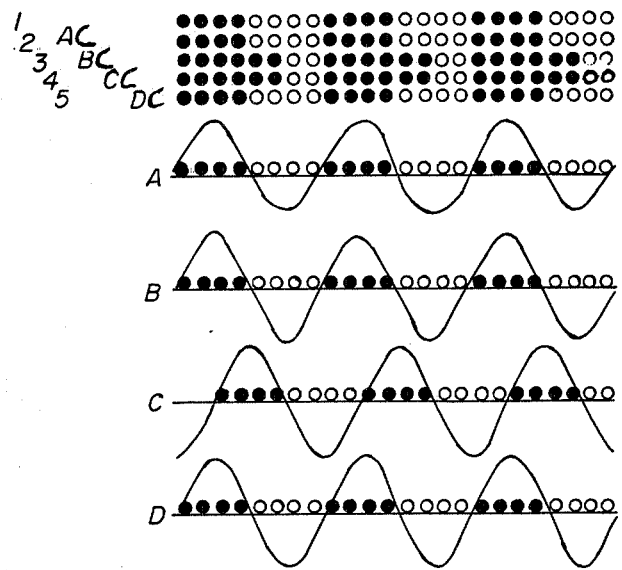
FIG. 11 illustrates one method of determining optimum velocity by a selected plotting of the traces.

Referring now to FIG. 11, there is shown in traces A, B, C, D a group of 4 sinusoidal traces, traces A, B, D are in phase, while trace C lags the other traces by 90°. The traces have been digitized at 8 intervals per cycle. Positive sign values are shown in black dots, negative values as white dots (no dots). This is equivalent to plotting 1 bit data with a "1" plotted black and a "0" plotted white (no print).

In the top rows of data, trace A is plotted in rows 1 and 2. Trace B is plotted in rows 2 and 3. Trace C is plotted in rows 3 and 4, and trace D is plotted in rows 4 and 5. Thus, row 1 is trace A; row 2 is the sum of A+B; row 3 is the sum of B+C; row 4 is the sum of C+D; row 5 is trace D. In those rows where the sum of two coherent (in phase) traces are plotted, there are equal numbers of black and white dots. In those rows where the sum of two traces are plotted which are out-of-phase, there are more black dots than white dots. If trace C was 180° out-of-phase, all circles in rows 3 and 4 would be black.

With this type of a plot it will be clear that if all traces are in phase, there will be 50% black and 50% white. As there is more and more out-of-phaseness, the percentage of black becomes greater than 50%, up to 75% for random phase, and to 100% for 180° out-of-phase.

The plotting is based on a truth table which involves the sum of the traces, where:
Black plus Black gives a Black trace
Black plus White gives a Black trace
White plus Black gives a Black trace, and
White plus White gives a White trace.

This type of plot can be done extremely rapidly, and a comparison by eye will tell which velocity is optimum. Not only that. It will be found that in certain areas of the plot (cross section) the black/white ratio (B/W ratio) will not be the same over the section. In other words, a single value of velocity may not be optimum at all values of depth and at all depth points.

It is possible also to plot a trace based on the products, rather than the sum of the traces. For example:
Black times Black gives a White trace
Black times White gives a Black trace
White times Black gives a Black trace, and
White times White gives a White trace.

This gives 0% black plot for all in phase traces, and 50% black for random phase traces. If adjacent traces are 180° out-of-phase, there will be 100% black.

What has been described is a method of carrying out seismic operations with a great many separate recording channels (256 to 1024, for example) in which geophone signals are digitized to 1 bit and all processing is carried out with 1 bit digitization, up to and including the NMO corrections of C.D.P. gathers, and the stacking of NMO corrected traces.

Preferably, in each gather, the NMO is carried out with a plurality of selected values of velocity, and the stacked traces are plotted in the form of different sections, one for each of the selected velocities.

Also, several embodiments are described for comparatively evaluating the resulting sections for different values of velocities. This is accomplished in three embodiments by:
(a) adding adjacent traces and plotting,
(b) multiplying adjacent traces and plotting; and (d) correlating adjacent traces and comparing correlograms.

Another embodiment of a method of evaluating the optimum choice of velocity is to calculate the "quality" of a C.D.P. stacked trace; where $$\text{Quality} = \frac{\Sigma \text{absolute amplitudes } T_{SUM}}{NK}$$

where N is the number of traces stacked, and K is the number of digitized values in each trace.

While in discussion of normal moveout, reference was made to FIG. 7, which illustrates what is called a single-ended spread, where the geophones are all on one side of the source, the method of processing C.D.P. data for optimum velocity can be carried out equally well, with the type of spread illustrated in FIG. 3, which is called a split spread, where the geophones extend in both directions from the source. This is well known in the art and need not be described further.

While our invention has been described with a certain degree of particularity, it is manifest that many changes may be made in the details of construction and the arrangement of components and details of operation. It is understood that the invention is not to be limited to the specific language used or the specific embodiments set forth herein by way of exemplification of the invention, but the invention is to be limited only by the scope of the attached claim or claims, including the full range of equivalence to which each element or step thereof is entitled.

What is claimed:

1. In a seismic prospecting system for generating seismic waves in the earth, having:
   a low energy seismic source;
   a plurality of geophones at spaced positions distant from said source;
   means to amplify and digitize the geophone signals;
   the method of operation and processing the seismic data comprising:
   (a) operating said source in CDP format, whereby each source operation is at a different spaced-apart independent position,
   (b) amplifying and digitizing to one bit a plurality of geophone signals which comprise a plurality of traces, in each of a plurality of records from a plurality of source points;
   (c) CDP stacking said 1 bit digitized signals; and wherein
   (d) the CDP fold is at least 40; and wherein the process of determining the optimum velocity for said CDP stack includes the steps of:
   (e) making a first CDP gather of a plurality of traces, centered about a first CDP point;
   (f) selecting at least a first seismic velocity as a function of depth;
   (g) applying normal movement, using a first selected velocity function, to said traces in said first gather;
   (h) stacking said NMO corrected traces and digitizing to 1 bit to form a first 1 bit stacked first CDP trace;
   (i) repeating steps (c) to (f) at at least one pair of spaced CD points to obtain at least one pair of first 1 bit stacked CDP traces, corresponding to said first velocity; and
   (j) determining the coherence between said at least one pair of first 1 bit stacked CDP traces corresponding to said first velocity.

2. The method as in claim 1 including the additional step of:
   (k) repeating steps (f) to (j) to obtain at least one pair of spaced CD Points, the coherence between at least one pair of second 1 bit stacked CDP traces corresponding to a second velocity, which is different in a first selected way from said first velocity.

3. The method as in claim 2 including the additional step of:
   (i) comparing the coherence values obtained for said pair of first 1 bit stacked CDP traces and said pair of second 1 bit stacked CDP traces for said first and said second velocities.

4. The method as in claim 2 including the additional steps of:
   (m) obtaining the coherence values between a plurality of pairs of adjacent traces of a first 1bit stacked plurality of CDP traces;
   (h) obtaining the coherence values between a plurality of pairs of adjacent traces of a second 1 bit stacked plurality of CDP traces; and
   (o) comparing the coherence values between a plurality of selected pairs of CDP traces in said first stack with the same plurality of selected pairs in said second stack.

5. The method as in claim 1 in which said step of determining the coherence between a selected pair of adjacent 1 bit stacked CDP traces comprises, correlating one of said pairs of traces with the other of said pair of traces.

6. The method as in claim 1 in which said step of determining the coherence between a selected pair of adjacent 1 bit stacked CDP traces comprises;
   (a) determining the value of the sum of the two traces of said pair of traces, on the basis that, at each comparison point;

| FIRST TRACE | SECOND TRACE | SUM |
|---|---|---|
| positive | positive | 1 |
| positive | negative | 1 |
| negative | positive | 1 |
| negative | negative | 0; and |

(b) determining the ratio of the total number of 1's to the total number of 0's.

7. The method as in claim 1 in which said step of determining the coherence between a selected pair of adjacent 1 bit stacked CDP traces comprises;
   (a) setting a value of $(+1)$ to each digitized 1 bit and a value of $(-1)$ to each digitized 0 bit; and
   (b) algebraically adding the $(+1)$ and $(-1)$ values to all the digitized values, and dividing that number by the total number of $(+1)$ and $(-1)$ values.

8. The method as in claim 1 in which said seismic source is a vibratory source, driven by a variable frequency sweep signal, and in which said step (b) includes the substeps of;
   (b1) amplifying said geophone signals
   (b2) correlating said amplified geophone signals with said sweep signal to obtain correlated geophone signals; and
   (b3) digitizing to 1 bit said correlated geophone signals, to form a plurality of traces.

9. In a seismic prospecting system having;
   a vibratory source driven by a reference sweep signal, a plurality of geophones at spaced positions distant from said source;

means to amplify and digitize the geophone signals;

the method of operation and processing the seismic data comprising the steps of;

(a) operating said source in CDP format, whereby each source operation is at a different spaced-apart independent position and operating said source at a number of spaced positions;

(b) amplifying and digitizing said received signal to form 1 bit received signals;

(c) digitizing said reference sweep signal;

(d) correlating each digitized received signal with said digitized reference sweep signal to form multi-bit correlograms;

(e) digitizing said correlograms to 1 bit;

(f) CDP stacking said 1 bit digitized correlograms; and wherein (g) the CDP fold is at least 40; and wherein the process of determining the optimum velocity for said CDP stack includes the steps of;

(h) making a first CDP gather at a first CD Point of said 1 bit digitized correlograms;

(i) choosing a first seismic velocity, and applying normal moveout corrections to the traces of said first CDP gather, and stacking said NMO corrected traces and digitizing to 1 bit to provide a first 1 bit stacked first CDP trace;

(j) repeating steps (h) and (i) with a second selected CD Point and said first velocity, and producing a first 1 bit stacked second CDP trace; and (k) determining the first coherence between said first and second CDP traces.

10. The method as in claim 9 including the additional steps of (i) repeating steps (h) and (j) for a second value of velocity applied to said first and second CDP traces, to obtain second 1 bit stacked first and second CDP traces, and determining the second coherence of these second CDP traces; and (m) comparing said first and second coherences.

11. In a seismic prospecting system for generating seismic waves in the earth, having:

a seismic source a plurality of geophones at spaced positions distant from said source;

means to amplify and digitize the geophone signals;

the method of operation and processing the seismic data comprising:

(a) operating said source in CDP format, by moving said source sequentially to spaced-apart independent positions, (b) amplifying and digitizing to one bit a plurality of geophone signals which comprise a plurality of traces, in each of a plurality of records from a plurality of source points;

(c) making a first CDP gather of a pluralty of traces, centered about a first CDP point;

(d) selecting at least a first seismic velocity as a function of depth;

(e) applying normal moveout, using a first selected velocity function, to said traces in said first gather;

(f) stacking said NMO corrected traces and digitizing to 1 bit to form a first 1 bit stacked first CDP trace;

(g) repeating steps (c) to (f) at at least one pair of spaced CD Points to obtain at least one pair of first 1 bit stacked CDP traces, corresponding to said first velocity; and (h) determining the coherence between said at least one pair of first 1 bit stacked CDP traces corresponding to said first velocity; and wherein said step of determining the coherence between a selected pair of adjacent 1 bit stacked CDP traces comprises;

(i) determining the value of the sum of the two traces of said pair of traces, on the basis that, at each comparison point;

| FIRST TRACE | SECOND TRACE | SUM |
|---|---|---|
| positive | positive | 1 |
| positive | negative | 1 |
| negative | positive | 1 |
| negative | negative | 0; and |

(j) determining the ratio of the total amount of 1's to the total number of 0's.

12. In a seismic prospecting system for generating seismic waves in the earth, having:

a seismic source a plurality of geophones at spaced positions distant from said source;

means to amplify and digitize the geophone signals;

the method of operation and processing the seismic data comprising:

(a) operating said source in CDP format, by moving said source sequentially to spaced-apart independent positions, (b) amplifying and digitizing to one bit a plurality of geophone signals which comprise a plurality of traces, in each of a plurality of records from a plurality of source points;

(c) making a first CDP gather of a plurality of traces, centered about a first CDP point;

(d) selecting at least a first seismic velocity as a functiion of depth;

(e) applying normal moveout, using a first selected velocity function, to said traces in said first gather;

(f) stacking said NMO corrected traces and digitizing to 1 bit to form a first 1 bit stacked first CDP trace;

(g) repeating steps (c) to (f) at at least one pair of spaced CD Points to obtain at least one pair of first 1 bit stacked CDP traces, corresponding to said first velocity; and (h) determining the coherence between said at least one pair of first 1 bit stacked CDP traces corresponding to said first velocity; and wherein said step of determining the coherence between a selected pair of adjacent 1 bit stacked CDP traces comprises;

(i) setting a value of (+1) to each digitized 1 bit and a value of (−1) to each digitized 0 bit; and (j) algebraically adding the (+1) and (−1) values to all the digitized values, and dividing that number by the total number of (+1) and (−1) values.

* * * * *